(12) United States Patent
Legner et al.

(10) Patent No.: US 8,262,525 B2
(45) Date of Patent: Sep. 11, 2012

(54) HYDROSTATIC-MECHANICAL POWER SPLIT TRANSMISSION

(75) Inventors: Jurgen Legner, Friedrichshafen (DE);
Roland Fischer, Oberteuringen (DE);
Michael Siber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 270 days.

(21) Appl. No.: 12/679,528

(22) PCT Filed: Aug. 15, 2008

(86) PCT No.: PCT/EP2008/060759
§ 371 (c)(1),
(2), (4) Date: Mar. 23, 2010

(87) PCT Pub. No.: WO2009/047037
PCT Pub. Date: Apr. 16, 2009

(65) Prior Publication Data
US 2010/0210389 A1   Aug. 19, 2010

(30) Foreign Application Priority Data

Oct. 2, 2007   (DE) .......................... 10 2007 047 194
Jul. 16, 2008   (DE) .......................... 10 2008 040 449

(51) Int. Cl.
*F16H 47/04*   (2006.01)
(52) U.S. Cl. ......................................................... 475/80
(58) Field of Classification Search ...................... 475/80
See application file for complete search history.

(56) References Cited

U.S. PATENT DOCUMENTS

| | | |
|---|---|---|
| 2,583,656 A | 1/1952 | Lay |
| 2,808,737 A | 10/1957 | Bullard, III |
| 3,023,638 A | 3/1962 | Westbury et al. |
| 3,204,486 A | 9/1965 | Lalio |
| 3,212,358 A | 10/1965 | Lalio |
| 3,580,107 A | 5/1971 | Orshansky, Jr. |
| 3,601,981 A | 8/1971 | Ifield |
| 3,626,787 A | 12/1971 | Singer |
| 3,714,845 A | 2/1973 | Mooney, Jr. |
| 3,834,164 A | 9/1974 | Ritter |
| 4,019,404 A | 4/1977 | Schauer |
| 4,121,479 A | 10/1978 | Schauer |
| 4,434,681 A | 3/1984 | Friedrich et al. |
| 4,446,756 A | 5/1984 | Hagin et al. |
| 4,563,914 A | 1/1986 | Miller |
| 4,776,233 A | 10/1988 | Kita et al. |
| 4,813,306 A | 3/1989 | Kita et al. |
| 4,976,664 A | 12/1990 | Hagin et al. |

(Continued)

FOREIGN PATENT DOCUMENTS

AT   197 650 B   10/1957
(Continued)

*Primary Examiner* — David D Le
*Assistant Examiner* — Erin D Bishop
(74) *Attorney, Agent, or Firm* — Davis & Bujold, P.L.L.C.

(57) ABSTRACT

A hydrostatic-mechanical power split transmission with at least two continuous operating ranges for use in agricultural and construction machines. The transmission has a summation planetary gear and a clutch for forward drive (7) and a clutch for reverse drive (6) that are arranged upstream of the summation gear. The transmission has a first sun gear (13) and a second sun gear (14) and a ring gear such that the ring gear (15) can be connected to an output drive shaft (22), via a clutch for the first driving range (23), and the second sun gear (14) can be connected to the output drive gear (22), via a clutch for the second operating range (27).

10 Claims, 5 Drawing Sheets

U.S. PATENT DOCUMENTS

| | | |
|---|---|---|
| 5,071,391 A | 12/1991 | Kita |
| 5,328,418 A | 7/1994 | Meyerle |
| 5,421,790 A | 6/1995 | Lasoen |
| 5,643,122 A | 7/1997 | Fredriksen |
| 5,667,452 A | 9/1997 | Coutant |
| 5,766,107 A | 6/1998 | Englisch |
| 5,868,640 A | 2/1999 | Coutant |
| 5,890,981 A | 4/1999 | Coutant et al. |
| 6,029,542 A | 2/2000 | Wontner |
| 6,056,661 A | 5/2000 | Schmidt |
| 6,485,387 B1 | 11/2002 | Goodnight et al. |
| 6,592,485 B2 | 7/2003 | Otten et al. |
| 6,761,658 B1 | 7/2004 | Stettler, Jr. |
| 7,097,583 B2 | 8/2006 | Lauinger et al. |
| 7,354,368 B2 | 4/2008 | Pollman |
| 7,448,976 B2 | 11/2008 | Hiraki et al. |
| 8,047,942 B2 * | 11/2011 | Ueda et al. ............ 475/79 |
| 2002/0042319 A1 | 4/2002 | Otten et al. |
| 2003/0089107 A1 | 5/2003 | Tani |
| 2003/0150662 A1 | 8/2003 | Tani |
| 2003/0166430 A1 | 9/2003 | Folsom et al. |
| 2004/0242357 A1 | 12/2004 | Ishizaki |
| 2006/0094554 A1 | 5/2006 | Schmidt |
| 2006/0276291 A1 | 12/2006 | Fabry et al. |
| 2007/0277520 A1 | 12/2007 | Gollner |
| 2007/0281815 A1 | 12/2007 | Gollner |
| 2008/0085801 A1 | 4/2008 | Sedoni et al. |
| 2008/0103006 A1 | 5/2008 | Pollman et al. |
| 2008/0214349 A1 | 9/2008 | Liebherr et al. |
| 2008/0214351 A1 | 9/2008 | Katayama et al. |
| 2009/0270212 A1 | 10/2009 | Ueda et al. |
| 2010/0056318 A1 | 3/2010 | Glockler |

FOREIGN PATENT DOCUMENTS

| | | |
|---|---|---|
| CA | 2 383 121 A1 | 11/2000 |
| DE | 1 069 978 | 11/1959 |
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 3622045 A1 | 3/1987 |
| DE | 42 06 023 A1 | 9/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 19954894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0683875 B1 | 11/1995 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A2 | 4/1999 |
| WO | WO 9915813 A2 * | 4/1999 |
| WO | 00/43695 A2 | 7/2000 |
| WO | WO 0043695 * | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

HYDROSTATIC-MECHANICAL POWER SPLIT TRANSMISSION

This application is a National Stage completion of PCT/EP2008/060759 filed Aug. 15, 2008, which claims priority from German patent application serial no. 10 2007 047 194.9 filed Oct. 2, 2007 and German patent application serial no. 10 2008 040 449.7 filed Jul. 16, 2008.

FIELD OF THE INVENTION

The invention relates to a hydrostatic-mechanical power split transmission.

BACKGROUND OF THE INVENTION

DE 10 2006 025 348 A1 discloses a hydrostatic-mechanical power split transmission with a mechanical output branch and a hydrostatic output branch which are summed by a summation gear, in order to enable continuous drive of a drive axle within different operating ranges.

DE 10 2006 025 347 B3 discloses a hydraulic module, consisting of two integrated oblique axle engines, whose displacement volume can be adjusted via a common yoke.

In a first position of the dual yoke, the pump is at minimal displacement and the motor at maximum displacement, and after adjustment of the dual yoke, the motor is adjusted in the direction of its minimal displacement, and the pump in the direction of its maximum displacement.

Agricultural vehicles, such as tractors, for example, have transmissions with a drive shaft and an output shaft, wherein the drive shaft and the output drive shaft exhibit a small axial spacing. Furthermore, it is necessary to configure the drive train for a tractor such that the tractor can reach 60 km/h.

Work machines, such as wheel loaders, for example, have a transmission with a drive shaft and an output shaft, which exhibit very large axial spacing. In contrast to a transmission for an agricultural vehicle, the drive shaft for the front axle and the drive shaft for the rear axle exhibit the same axial spacing relative to the drive shaft of the transmission, whereas in an agricultural vehicle, the drive shaft to the rear axle is at a distance from the drive shaft to the front axle.

SUMMARY OF THE INVENTION

The invention is based on the problem of creating a hydrostatic-mechanical power split transmission that can be used in a simple manner in an agricultural vehicle, such as a tractor, for example, and in a work machine, such as a wheel loader, for example.

This problem is resolved with a hydrostatic-mechanical power split transmission of the generic type that also exhibits the specific characteristics of the principal claim.

According to the invention, the hydrostatic-mechanical power split transmission has a drive shaft which is connected, for example, to an internal combustion engine. On the one hand, the drive shaft provides traction power by means of a clutch for forward drive, via the planet carrier in the summation gear, and on the other hand, via a clutch for reverse drive in the planet carrier of the summation gear.

The clutch for forward drive is preferably arranged coaxially to the drive shaft and the clutch for reverse drive is arranged on a shaft that is placed at a distance from the drive shaft. The clutch for reverse drive is connected via a spur-gear stage to the drive shaft and via a spur-gear stage to the planet gear of the summation gear. The clutch for forward drive is also connected via a spur-gear stage, to the planet carrier of the summation gear. The summation gear is configured as a planetary gear set, this planetary gear set having at least one double planetary gear that engages with a first sun gear and a second sun gear and a ring gear, wherein the first sun gear is connected to a first hydraulic unit and the ring gear to a second hydraulic unit.

In the first operating range, the first hydraulic unit acts as a pump and the second hydraulic unit as a motor.

In the second operating range, the first hydraulic unit acts as a motor and the second hydraulic unit as a pump.

The first sun gear is preferably arranged coaxially to a shaft of the first hydraulic unit and the second sun gear is connected, via a spur-gear stage, to the shaft of the second hydraulic unit, by means of which the shafts of the first and second hydraulic units are arranged at a distance from each other.

The hydraulic units are preferably designed with a dual yoke, as disclosed in DE 10 2006 025 347 B3. Spur gears with clutches arranged on shafts are arranged downstream of the spur gears with the clutches for forward drive and for reverse drive, also downstream of the summation planetary gear set and the two hydraulic units in order to shift to several continuous driving ranges.

A clutch for a first operating range is connected, via a spur-gear stage, to the drive shaft of the second hydraulic unit.

A clutch for a second operating range is connected, via a spur-gear stage, to the second sun gear of the summation planetary gear set.

If the clutch of the first operating range is operated in the direction of engagement, then the output drive shaft of the transmission is connected, via the spur-gear stage, to the drive shaft of the second hydraulic unit.

If the clutch for the second operating range is engaged, the drive shaft of the transmission is connected, via spur-gear stages, to the second sun wheel. Because toothed wheels on the output drive shaft of the transmission are in operative connection with toothed wheels on the shaft of the second hydraulic unit, there is the possibility of spatially arranging this drive shaft such that the output shaft, via an additional spur-gear stage, drives the drive shaft of the rear axle of a tractor and directly drives the front axle of the tractor or drives the front and rear axles of a wheel loader via a spur-gear stage.

When configured for a tractor, the spur-gear stage with the drive shaft for the rear axle is arranged in the direction of the drive shaft of the transmission, and the drive shaft for the front axle of the vehicle runs nearly parallel to the output drive shaft of the transmission.

In order to implement an additional speed reduction range, there is a clutch for a third operating range on the shaft of the second hydraulic unit, by means of which clutch the shaft of the second hydraulic unit can be connected, via a spur-gear stage, to the output drive shaft.

In this way it is possible to create, without major complexity, a hydrostatic-mechanical power split transmission with two or three operating ranges for an agricultural vehicle or a work machine.

BRIEF DESCRIPTION OF THE DRAWINGS

Additional characteristics can be seen from the description of the figures. The following is shown.

DETAILED DESCRIPTION OF THE PREFERRED EMBODIMENTS

FIG. 1

Figure 1:
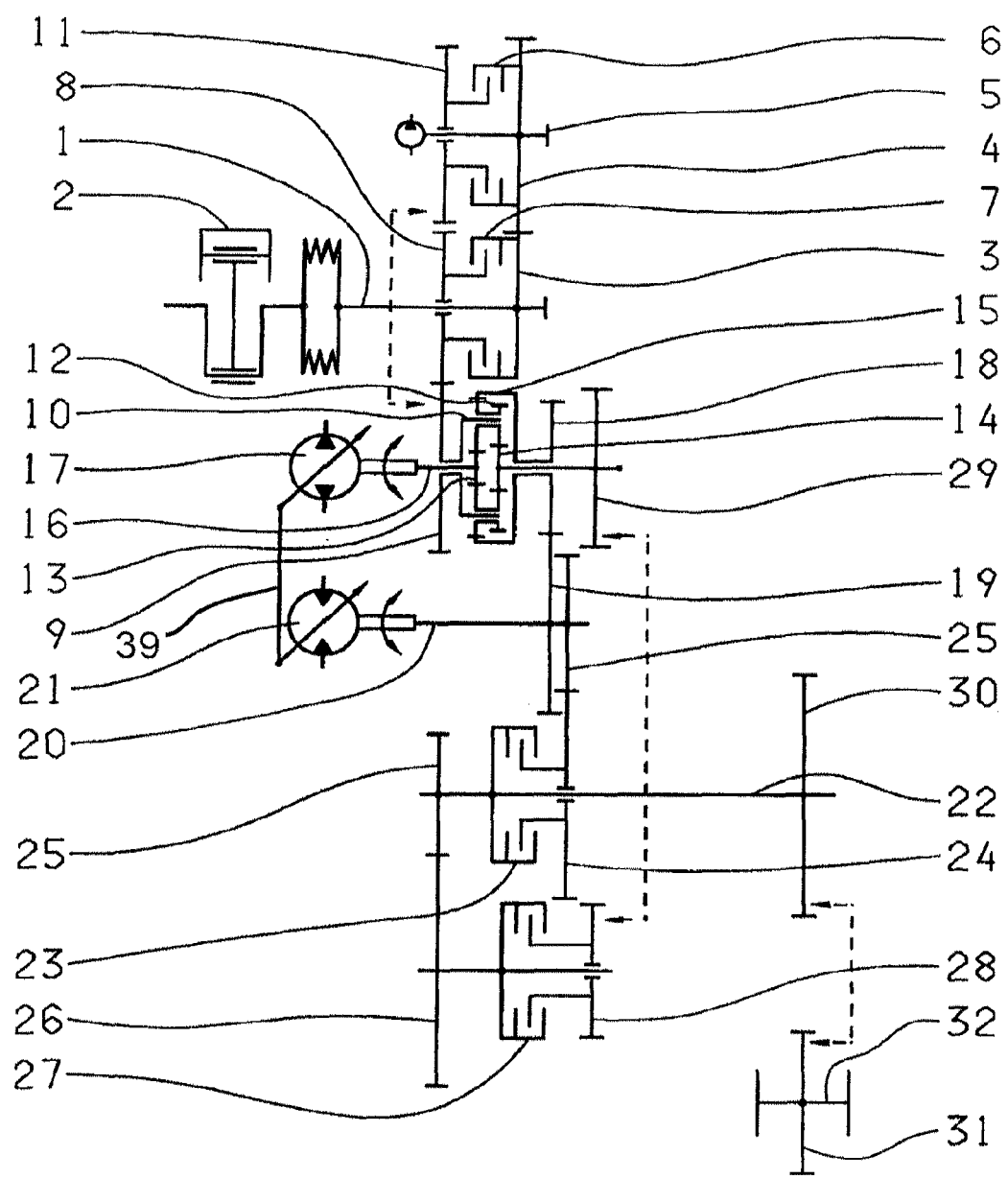
FIG. 1 a hydrostatic-mechanical power split transmission for a work machine with two operating ranges.

A drive shaft 1 is connected in a rotationally fixed manner to a drive motor 2. The drive shaft 1 drives an auxiliary drive via a fixed gear 3 and a fixed gear 4 and the clutch for reverse drive 6 and the clutch for forward drive 7. The clutch for forward drive 7 is arranged coaxially to the drive shaft 1, and the clutch for reverse drive 6 is arranged at a distance from the drive shaft 1. By engaging the clutch for forward drive, the drive shaft 1 actuates via an idler gear 8 that is arranged on the drive shaft 1, an idler gear 9 that is connected in a rotationally fixed manner to a planet carrier 10. By engaging the clutch for reverse drive 6, the drive shaft 1 actuates the idler gear 9 via an idler gear 11. At least one double planetary gear 12 is arranged on the planet carrier 10. The double planetary gear 12 engages a first sun gear 13 and a second sun gear 14, as well as a ring gear 15. The first sun gear 13 is connected in a rotationally fixed manner to a shaft 16 of the first hydraulic unit 17. The ring gear 15 is connected, via the idler gear 18 and the fixed gear 19, to the shaft 20 of the second hydraulic unit 21. The output drive shaft 22 can be connected to the shaft 20 via a clutch, which is arranged coaxially to the output drive shaft 22, for the first operating range 23, the idler gear 24, and the fixed gear 25. The output drive shaft 22 can be connected to the second sun gear 14 via the fixed gear 25', the fixed gear 26, and the clutch for the second operating range 27, the idler gear 28 and the fixed gear 29. The fixed gear 29 is arranged coaxially to the second sun gear 14; the fixed gear 26, the clutch for the second operating range 27, and the idler gear 28 are arranged coaxially; the fixed gear 25', the clutch for the first operating range 23, and the idler gear 24 are arranged coaxially to the output drive shaft 22. In order to create an axial spacing sufficient for a wheel loader, a fixed gear 30 and a fixed gear 31 are arranged on the output drive shaft 22, the fixed gear 31 being arranged coaxially to a shaft 32 which can be connected in a rotationally fixed manner to drive axles for a front axle and a rear axle. The hydraulic units 17, 21 have a common or dual yoke 39 and may be angled obliquely with respect to their respective input shafts 16, 20, as indicated shown by the doubled headed arrows.

It is possible, for example for an agricultural vehicle, to use the shaft that is connected to the fixed gear 26 as an output shaft, the drive shaft then driving the wheels.

It is also possible to use the shaft 36 for driving the wheels.

In an additional embodiment the idler gear 24 meshes directly with the fixed gear 19, in which case the fixed gear 25 is omitted.

In an additional embodiment, the fixed gear 31 meshes directly with the fixed gear 25', in which case the fixed gear 30 can be omitted.

FIG. 2

The only difference between this and FIG. 1 is that a third operating range can be switched by means of the clutch for the third operating range 33 via the idler gear 34 to the fixed gear 35 and from there to the output drive shaft 22.

In that way, a first operating range for forward drive can be switched by engaging the clutch for forward drive 7 and the clutch for the first operating range 23.

A second operating range for forward drive can be switched by engaging the clutch for forward drive 7 and the clutch for the second operating range 27.

A third operating range can be switched by shifting the clutch for forward drive 7 and the clutch for the third operating range 33.

A first operating range for reverse drive can be switched by shifting the clutch for reverse drive 6 and the clutch for the first operating range 23.

A second operating range for reverse drive can be switched by shifting the clutch for reverse drive 6 and the clutch for the second operating range 27.

A third operating range for reverse drive can be switched by shifting the clutch for reverse drive 6 and the clutch for the third operating range 33.

FIG. 3

This is different from FIG. 1 only in that the output drive shaft 22 is connected in a rotationally fixed manner to a shaft 36 for connecting to a front axle of the tractor, and in that a fixed gear 37 engages with a fixed gear 30 and actuates a shaft 38 for driving the rear axle. The shaft 38 is arranged in the direction of the drive shaft 1, because a tractor requires smaller axial distance between the drive shaft 1 and the shaft 38; there is a greater distance between the shaft 36 and the drive shaft 1, in order to drive the front axle under the drive engine.

FIG. 4

Figure 2:
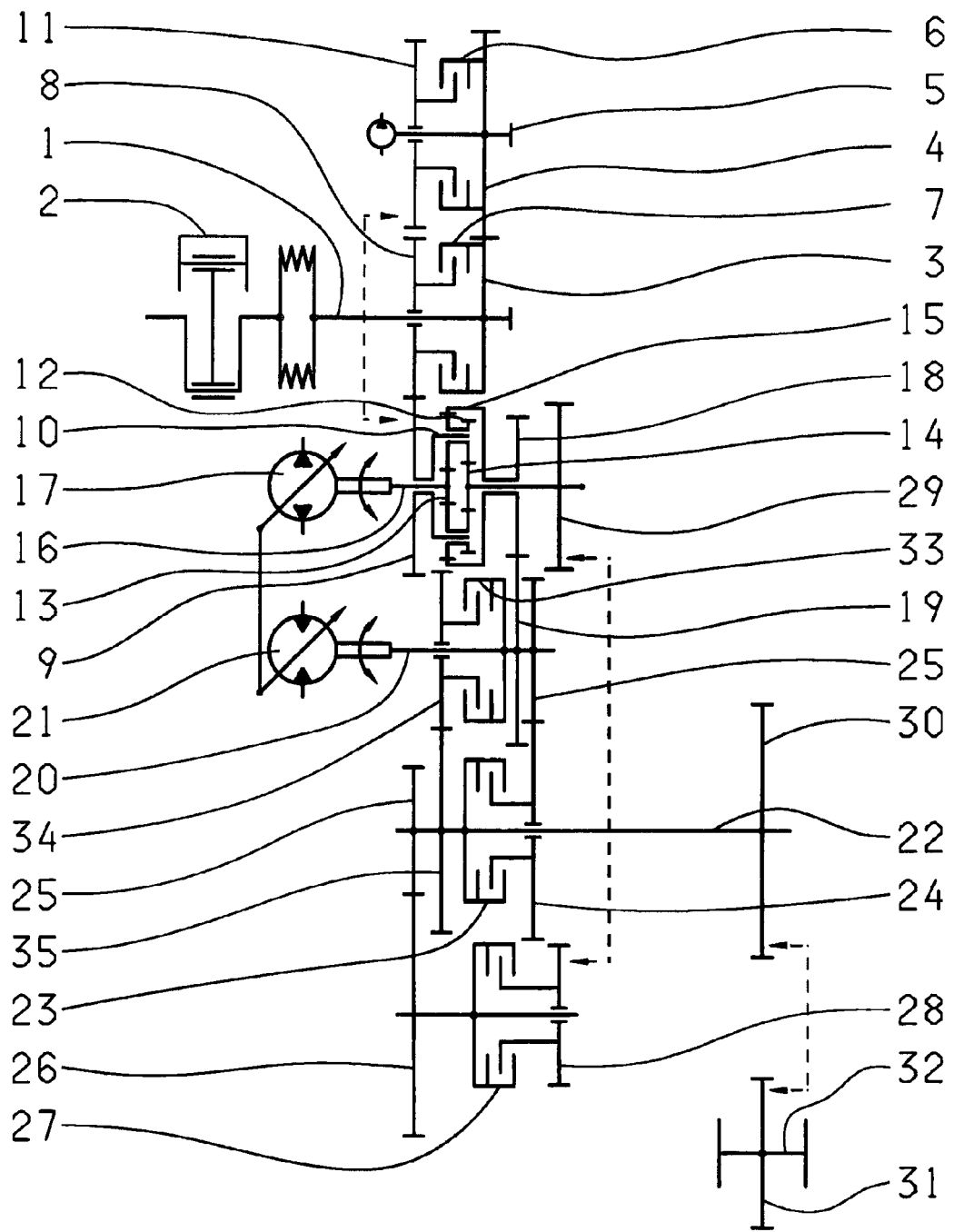
FIG. 2 a hydrostatic-mechanical power split transmission for a work machine with three operating ranges.
Figure 3:
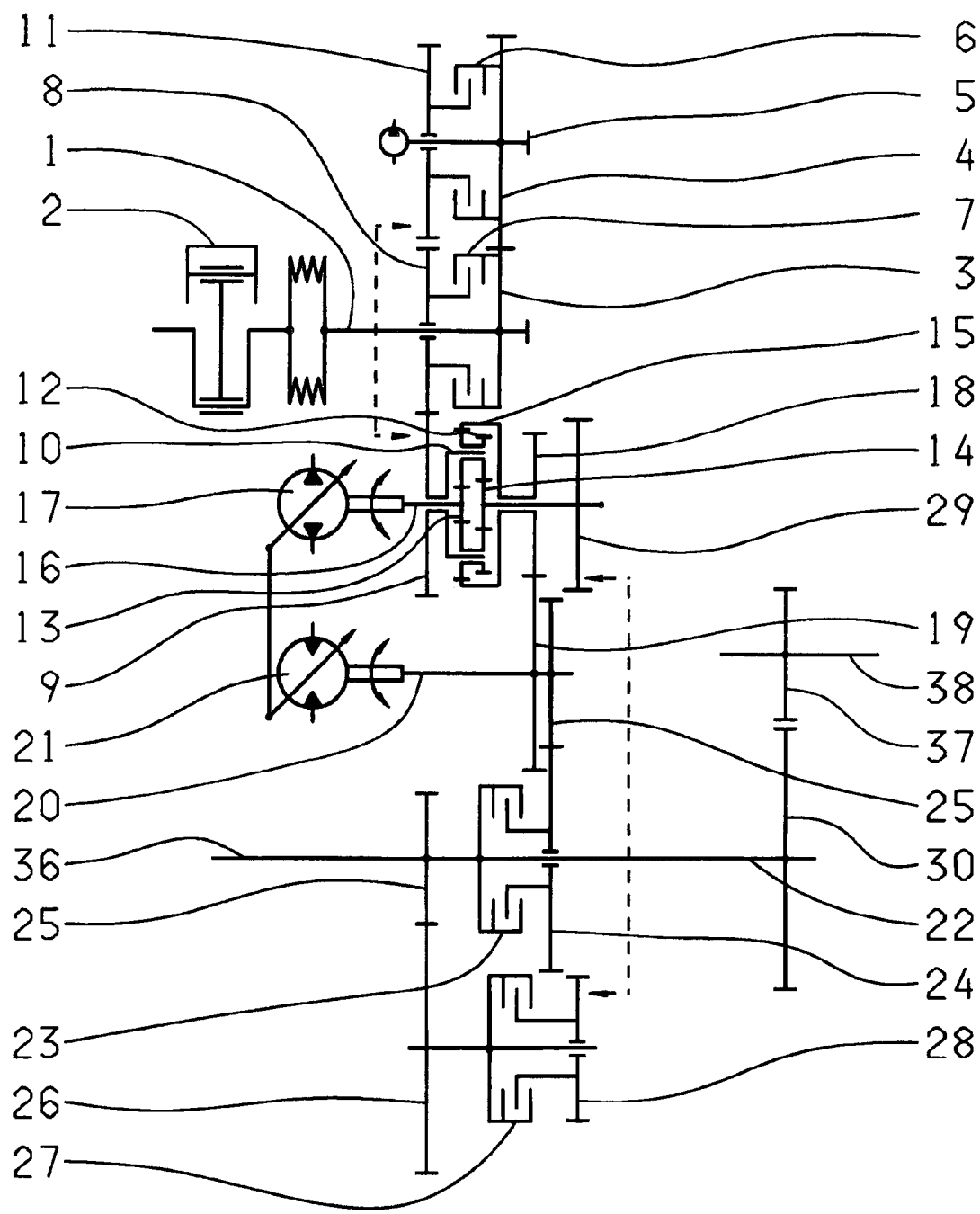
FIG. 3 a hydrostatic-mechanical power split transmission for an agricultural vehicle with two operating ranges.
Figure 4:
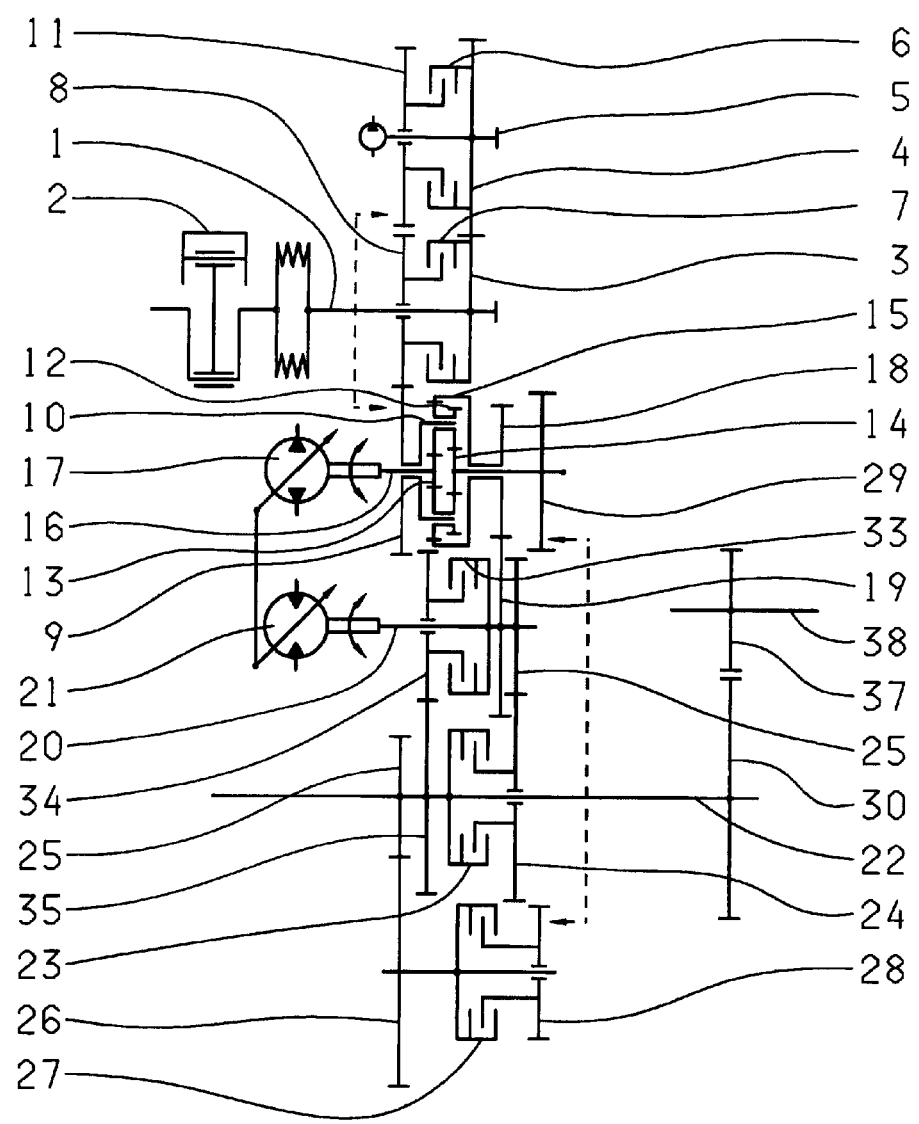
FIG. 4 a hydrostatic-mechanical power split transmission for an agricultural vehicle with three operating ranges.

This is different from FIG. 3 only in that the third operating range is present, as shown in FIG. 2.

Figure 5:
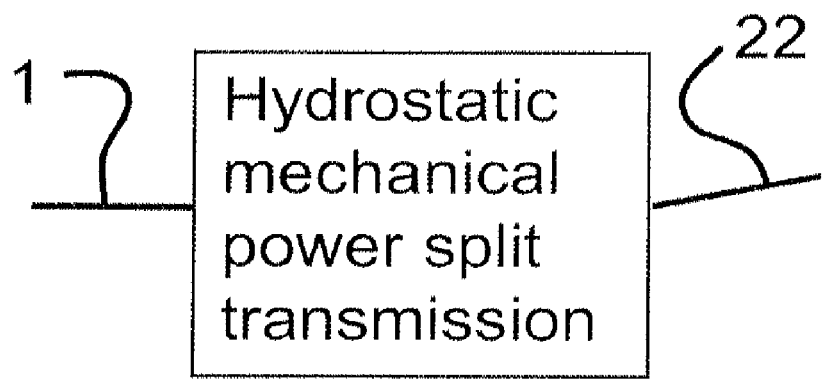
FIG. 5 is a diagrammatic drawing showing the output drive shaft arranged oblique with respect to the drive shaft.

FIG. 5 shows the output drive shaft 22 arranged oblique with respect to the drive shaft 1.

REFERENCE SYMBOLS

1 Drive shaft
2 Drive engine
3 Fixed gear
4 Fixed gear
5 Auxiliary drive
6 Clutch for reverse driving
7 Clutch for forward driving
8 Idler gear
9 Idler gear
10 Planet carrier
11 Idler gear
12 Double planetary gear
13 First sun gear
14 Second sun gear
15 Ring gear
16 Shaft
17 First hydraulic unit
18 Idler gear
19 Fixed gear
20 Shaft
21 Second hydraulic unit
22 Output drive shaft
23 Clutch for the first operating range
24 Idler gear
25 Fixed gear
25' Fixed gear
26 Fixed gear
27 Clutch for the second operating range
28 Idler gear
29 Fixed gear
30 Fixed gear
31 Fixed gear
32 Shaft 33 Clutch for the third operating range
34 Idler gear
35 Fixed gear
36 Shaft
37 Fixed gear
38 Shaft
39 Common yoke

The invention claimed is:

1. A hydrostatic-mechanical power split transmission comprising:
   a drive shaft (1) being connectable to a planet carrier (10) of a summation gear via a forward drive clutch (7), and via a reverse drive clutch (6),
   the summation gear having a first sun gear (13), a second sun gear (14), a ring gear (15), and at least on double planetary gear (12) arranged on the planet carrier (10),
   a first hydraulic unit (17), of a hydraulic transmission branch, being directly connected to the first sun gear (13) in a rotationally fixed manner, and
   a second hydraulic unit (21) of the hydraulic transmission branch being directly connected to a first spur-gear stage, and the first spur-gear stage being directly connected to the ring gear (15),
   the second hydraulic unit (21) being connectable to an output drive shaft (22), via a second spur-gear stage and a first operating range clutch (23), and
   the second sun gear (14) being connectable to the output drive shaft (22) via a third spur-gear stage with a second operating range clutch (27).

2. The hydrostatic-mechanical power split transmission according to claim 1, wherein the first operating range clutch (23) is arranged coaxially with the output drive shaft (22).

3. The hydrostatic-mechanical power split transmission according to claim 2, wherein the output drive shaft (22) drives, via a fourth spur-gear stage (30, 37), an input shaft (38) for driving an axle of a vehicle.

4. The hydrostatic-mechanical power split transmission according to claim 3, wherein the vehicle is an agricultural machine, and
   the axle of the vehicle is a rear axle.

5. The hydrostatic-mechanical power split transmission according to claim 1, wherein the forward drive clutch (7) is arranged coaxially to the drive shaft (1), and the reverse drive clutch (6) and the summation gear are arranged spaced from the drive shaft (1).

6. The hydrostatic-mechanical power split transmission according to claim 1, wherein the second operating range clutch (27) is coaxial with a first fixed gear (26) of a fifth spur-gear stage, and a second fixed gear (25) of the fifth spur-gear stage is coaxial with the output drive shaft (22).

7. The hydrostatic-mechanical power split transmission according to claim 1, wherein the first hydraulic unit (17) and the second hydraulic unit (21) are oblique axle units which have a common yoke.

8. The hydrostatic-mechanical power split transmission according to claim 1, wherein the first and the second hydrostatic units (17, 21) are capable of shifting torque between different operating ranges, when the different operating ranges are synchronous in speed at a time of shifting.

9. A hydrostatic-mechanical power split transmission comprising:
   an input drive shaft (1) being connectable to a planet carrier (10) of a summation gear via a forward drive clutch (7) and via a reverse drive clutch (6),
   the summation gear having a first sun gear (13), a second sun gear (14), at least one double planetary gear (12) arranged on the planet carrier (10), and a ring gear (15),
   a first hydraulic unit (17), of a hydraulic transmission branch, being connected to the first sun gear (13) in a rotationally fixed manner, and
   a second hydraulic unit (21) of the hydraulic transmission branch being connected, via a first spur-gear stage, to the ring gear (15),
   the second hydraulic unit (21) being connectable to an output drive shaft (22), via a second spur-gear stage and a first operating range clutch (23), and
   the second sun gear (14) being connectable to the output drive shaft (22) via a third spur-gear stage with a second operating range clutch (27),
   wherein the second hydraulic unit (21) is connectable to the output drive shaft (22) via a third operating range clutch (33), and the third operating range clutch (33) is arranged coaxially with a unit drive shaft (20) of the second hydraulic unit (21).

10. A hydrostatic-mechanical power split transmission comprising:
    a drive shaft (1) being connectable to a planet carrier (10) of a summation gear via a forward drive clutch (7) and via a reverse drive clutch (6),
    the summation gear having a first sun gear (13), a second sun gear (14), at least one double planetary gear (12) arranged on the planet carrier (10), and a ring gear (15),
    a first hydraulic unit (17), of a hydraulic transmission branch, being connected to the first sun gear (13) in a rotationally fixed manner, and
    a second hydraulic unit (21) of the hydraulic transmission branch being connected, via a first spur-gear stage, to the ring gear (15),
    the second hydraulic unit (21) being connectable to an output drive shaft (22), via a second spur-gear stage and a first operating range clutch (23),
    the second sun gear (14) being connectable to the output drive shaft (22) via a third spur-gear stage with a second operating range clutch (27),
    the first operating range clutch (23) is arranged coaxially with the output drive shaft (22),
    the output drive shaft (22) drives, via a fourth spur-gear stage (30, 37), an input shaft (38) for driving an axle of a vehicle,
    wherein the vehicle is a work machine, and
    the output drive shaft (22) drives the input shaft (32) of the axle via a fourth spur-gear stage and the output drive shaft (22) is arranged oblique with respect to the drive shaft (1).

* * * * *